United States Patent
Enoki (10) Patent No.: US 9,018,894 B2
(45) Date of Patent: Apr. 28, 2015

(54) VEHICULAR POWER SUPPLY SYSTEM

(75) Inventor: Keiichi Enoki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 634 days.

(21) Appl. No.: 13/181,942

(22) Filed: Jul. 13, 2011

(65) Prior Publication Data

US 2012/0268058 A1 Oct. 25, 2012

(30) Foreign Application Priority Data

Apr. 19, 2011 (JP) .................................. 2011-092983

(51) Int. Cl.
*H02J 7/14* (2006.01)
*B60R 16/033* (2006.01)
*H02J 7/00* (2006.01)
*B60L 7/12* (2006.01)
*B60L 11/18* (2006.01)

(52) U.S. Cl.
CPC ............. *B60R 16/033* (2013.01); *H02J 7/0054* (2013.01); *H02J 7/14* (2013.01); *B60L 7/12* (2013.01); *B60L 11/1862* (2013.01); *B60L 11/1868* (2013.01); *B60L 2210/12* (2013.01); *B60L 2240/429* (2013.01); *B60L 2240/545* (2013.01); *B60L 2240/547* (2013.01); *B60L 2240/549* (2013.01); *B60L 2250/26* (2013.01); *B60L 2240/527* (2013.01)

(58) Field of Classification Search
USPC ............................. 320/104, 116, 139; 307/49
See application file for complete search history.

(56) References Cited

U.S. PATENT DOCUMENTS 4,423,379 A * 12/1983 Jacobs et al. ................... 324/429
5,321,627 A * 6/1994 Reher .............................. 702/63

(Continued)

FOREIGN PATENT DOCUMENTS

DE    101 50 372 A1    4/2003
EP    1 595 748 A1    11/2005

(Continued)

OTHER PUBLICATIONS

Japanese Office Action in Japanese Patent Application No. 2011-092983, issued on Apr. 9, 2013.
German Office Action issued Dec. 9, 2014 in German Patent Application No. 10 2011 084 777.4.

*Primary Examiner* — Yalkew Fantu
(74) *Attorney, Agent, or Firm* — Sughrue Mion, PLLC (57) ABSTRACT

A vehicular power supply system is provided, which is equipped with a two-battery power supply system including a lithium-ion battery and a lead battery, and can securely supply the lead battery with power without fail even when the lithium-ion battery is disconnected by a relay. The vehicular power supply system comprises: a lead battery; a lithium-ion battery that can be charged and discharges at a voltage higher than the lead battery's voltage; a step-down DC-DC converter that is connected between the lead battery and the lithium-ion battery and whose output voltage is controllable; a generator connected with the step-down DC-DC converter and the lithium-ion battery; a lithium-ion battery SOC detection means for detecting a state of charge of the lithium-ion battery; a relay for the lithium-ion battery by which the battery is connected to or disconnected from the generator and the step-down DC-DC converter; and a control means, based on the state of charge of the lithium-ion battery, for taking control of switching on and off the relay for the lithium-ion battery.

5 Claims, 7 Drawing Sheets

(56) References Cited

U.S. PATENT DOCUMENTS

| | | | |
|---|---|---|---|
| 7,336,002 B2* | 2/2008 | Kato et al. | 307/10.6 |
| 2004/0135544 A1* | 7/2004 | King et al. | 320/116 |
| 2004/0189248 A1* | 9/2004 | Boskovitch et al. | 320/116 |
| 2006/0132140 A1* | 6/2006 | Weber | 324/433 |
| 2009/0211826 A1* | 8/2009 | Hashimoto | 180/65.275 |
| 2010/0065349 A1* | 3/2010 | Ichikawa et al. | 180/65.1 |

FOREIGN PATENT DOCUMENTS

| | | |
|---|---|---|
| JP | 4100020 B2 | 10/2003 |
| JP | 3972906 B2 | 11/2004 |
| JP | 2004328988 A | 11/2004 |
| JP | 2008-278564 A | 11/2008 |
| JP | 2008278564 A | 11/2008 |

* cited by examiner

VEHICULAR POWER SUPPLY SYSTEM

BACKGROUND OF THE INVENTION

1. Field of the Invention

The present invention relates to a vehicular power supply system equipped with a two-battery power supply system including a lithium-ion battery and a lead battery.

2. Description of the Related Art

Until now, there is publicly known a two-battery power supply system that includes a lithium-ion battery and a capacitor having better charge acceptability than a lead battery, stores as electric energy regenerated energy obtained during deceleration, and makes use of the stored energy in operation states other than the deceleration.

Since kinetic energy during the deceleration, which has been converted into heat by a mechanical brake and wasted, is now stored as electric power, the number of power generation times by a generator can be decreased, and as a result, a generator load imposed on the engine is reduced, so that its gas mileage can be enhanced.

In general, in using two batteries that have different nominal voltages, if they are directly connected with each other, a current flows from the one having the higher voltage of the two to the lower voltage one; therefore in order to compensate the voltage difference, a DC-to-DC voltage conversion circuit, that is, a DC-DC converter is connected between those batteries.

Moreover, a generator capable of controlling a field current to the rotor from an ECU (engine control unit) so as to control generation output is generally used, which takes control of the generation output depending on operation states, such as increasing the output during deceleration.

Although the lithium-ion battery has high energy density and excels in the charge acceptability, on the other hand, the battery can only be safely used in a limited voltage and temperature range, and in addition, it is weak in overcharge, overdischarge and also use at low and high temperatures. It is widely known that the battery would be in danger of leading to deterioration or catching fire if it is used outside a usable temperature range or repeatedly overcharged and overdischarged.

A vehicular power supply system is disclosed in Patent Document 1, for example, in which the generator and the sub power-supply thereof are connected with each other, regenerated power during deceleration is stored in the sub power-supply, and the stored power is supplied to its main power-supply and electrical load by way of a DC-DC convertor and a switch.

Moreover, another power supply system is disclosed in Patent Document 2, which includes a relay for disconnecting the sub power-supply from the power supply system, and when a lithium-ion battery that is the sub power-supply is overcharged or overdischarged, the relay is switched off to disconnect the lithium-ion battery, and power generated by the generator is supplied to its lead battery and electrical load by way of the DC-DC convertor.

Patent Document 1: Japanese Patent No. 3972906
Patent Document 2: Japanese Patent No. 4100020

However, the lithium-ion battery is charged and discharged in Patent Documents 1 and 2 even when the temperature of the battery is outside the usable temperature range, raising a fear of accelerating deterioration of the lithium-ion battery. Moreover, since the generator is usually connected to the lithium-ion battery in Patent Document 2, at the very beginning of starting generation, power is supplied from the lithium-ion battery, that is, a source outside the generator, to produce a field current and start generation, and once the generation is started, the power supply is switched over to internal power generated by the generator itself, so as to produce the field current and generate power.

Therefore, when the relay is switched off to disconnect the lithium-ion battery from the power supply system, the generator cannot produce the field current necessary for starting the generation, raising a fear of failing to generate power.

Moreover, when the generator is connected to the lithium-ion battery constituting a high voltage system as represented in the configuration of the power supplies according to Patent Documents 1 and 2, the voltage applied to the generator becomes the same as the lithium-ion battery voltage; therefore there has been another fear that a voltage generated by the generator is lowered in a state of a low engine rotation speed, such as that in idling, so that generated power would become unable to be output.

Moreover in Patent Document 2, there has been another fear that when the lithium-ion battery is disconnected from the power supply system, the relay repeats switching on and off while a current is flowing therethrough, so that contacts thereof would be welded together, accelerating deterioration of the relay.

Moreover in Patent Documents 1 and 2, when the electrical load is abruptly lost amid deceleration regeneration during which power is supplied to the lithium-ion battery and to the lead battery and the electrical load by way of the DC-DC converter, the charging amount of the lithium-ion battery abruptly increases; therefore there has been another fear that an overcurrent would flow through the lithium-ion battery or an overvoltage would be applied to the battery.

Furthermore, since output power from the generator varies depending on the temperature thereof, there has been another fear that the amount of charging current to the lithium-ion battery cannot be appropriately controlled.

Moreover, in Patent Documents 1 and 2, if the output voltage of the DC-DC converter is set to a voltage capable of charging the lead battery at all times, that is, 14.5 V, there has been another fear that power consumed in vain in the 12V-system electrical load connected in parallel with the lead battery would be increased.

SUMMARY OF THE INVENTION

The present invention has been made to resolve the problems described above, and aims at providing a vehicular power supply system equipped with a two-battery system including a lithium-ion battery and a lead battery, wherein power can be securely supplied to the lead battery without fail even when the lithium-ion battery is disconnected by a relay.

A vehicular power supply system according to the present invention comprises: a lead battery; a lithium-ion battery that can be charged and discharged at a voltage higher than the lead battery's voltage; a step-down DC-DC converter that is connected between the lead battery and the lithium-ion battery and whose output voltage is controllable; a generator connected with the step-down DC-DC converter and the lithium-ion battery; a lithium-ion battery SOC detection means for detecting a state of charge of the lithium-ion battery; a relay for the lithium-ion battery by which the lithium-ion battery is connected to and disconnected from the generator and the step-down DC-DC converter; and a control means, based on the state of charge of the lithium-ion battery, for taking control of switching on and off the relay for the lithium-ion battery.

According to a vehicular power supply system of the present invention, the lithium-ion battery can be connected to the power supply system or disconnect from the same depending on the state of charge of the battery; therefore the lithium-ion battery can be prevented from deteriorating and used safely.

The foregoing and other object, features, aspects and advantage of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
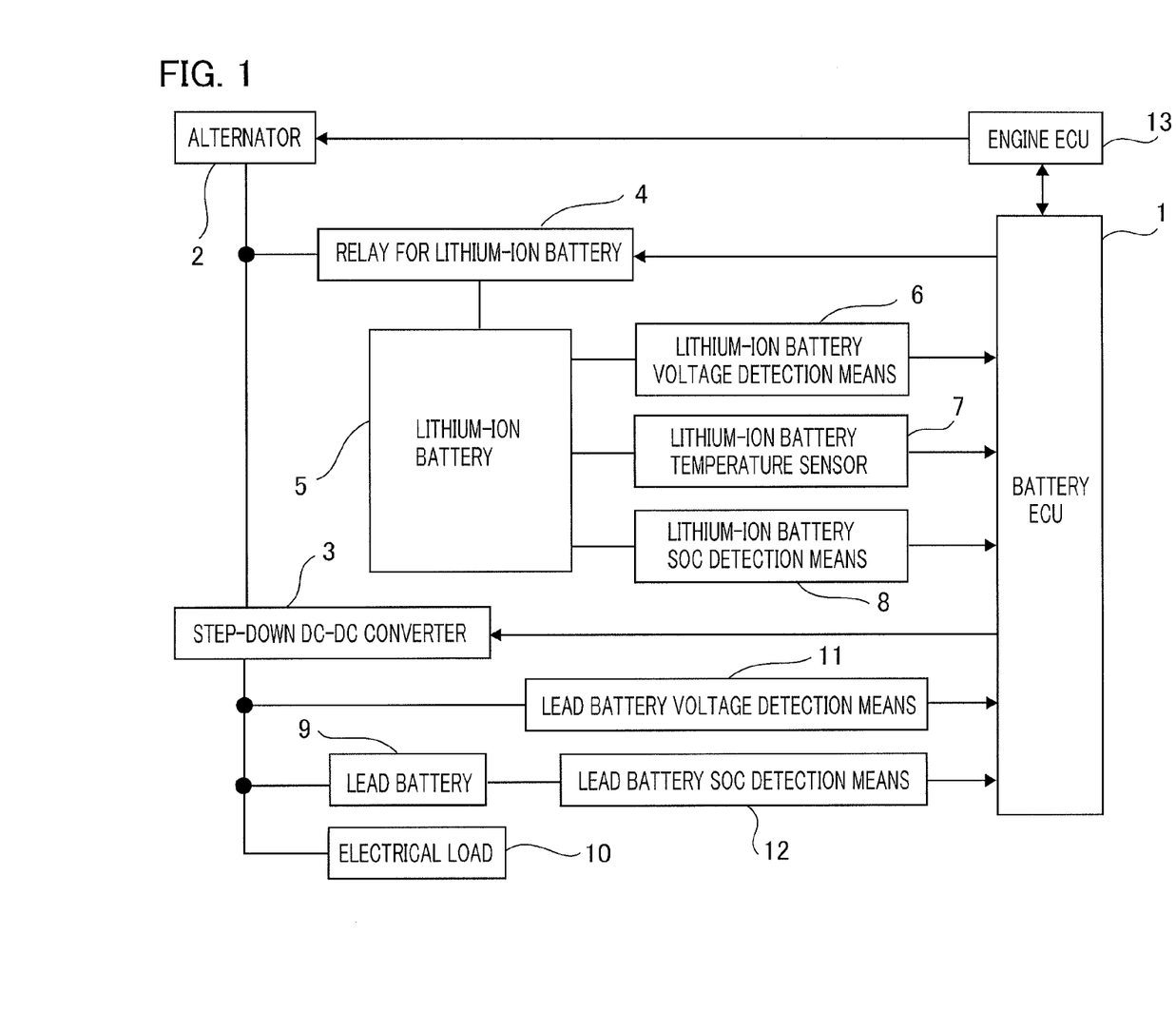
FIG. 1 is a block diagram showing the configuration of a vehicular power supply system according to Embodiment 1 of the present invention.

FIG. 1 is a block diagram showing the configuration of a vehicular power supply system according to Embodiment 1 of the present invention.

In FIG. 1, the present power supply system includes a combination of a lead battery 9 (nominal voltage 12 V) with a lithium-ion battery 5 having a voltage higher than that voltage (for example, nominal voltage 18.5 V with five cells connected in series), and a step-down DC-DC converter 3 is interposed between those batteries in order to compensate the voltage difference between them.

The lithium-ion battery 5 excels in energy density and charge acceptability; however on the other hand, the battery is weak in overcharge and overdischarge and also has a fear of catching fire; therefore various protection circuits are required in order to safely make use of the battery. As to the temperature thereof, the battery can be generally used from −20° C. to 60° C.; however from the point of view of safety in use, the battery is required not to be charged below 0° C. nor charged and discharged above 50° C.

The step-down DC-DC converter 3 is a DC-to-DC voltage converter whose output voltage is lower than the input voltage and a chopper-type converter equipped with a microcomputer. The step-down DC-DC converter 3 is connected with a battery ECU (electrical control unit) through a LIN (local interconnect network), for example; the step-down DC-DC converter 3 operates following instructions from the battery ECU 1. The battery ECU 1 issues the instructions to the step-down DC-DC converter 3, can operate and stop the converter 3, and can also change a target output voltage therefor so as to control the output voltage.

The battery ECU 1 is a microcomputer including a CPU, a RAM, a ROM and an input/output unit. Based on information from a lithium-ion battery voltage detection means 6 for detecting the voltage of the lithium-ion battery 5, a temperature sensor 7 for detecting the temperature of the battery 5 and a lithium-ion battery SOC detection means 8 for detecting a SOC (state of charge) of the battery 5, the battery ECU monitors the lithium-ion battery 5 and takes control of charging and discharging the battery so that the lithium-ion battery 5 will not be overcharged nor overdischarged.

Moreover, based on information from a lead battery voltage detection means 11 for detecting the voltage of a lead battery 9 and a lead battery SOC detection means 12 for detecting a SOC of the lead battery 9, the battery ECU takes control of charging and discharging the battery so that the lead battery 9 is neither overcharged nor discharged.

The lithium-ion battery SOC detection means 8 and the lead battery SOC detection means 12 include lithium-ion battery and lead battery charging/discharging detection means for detecting a charging/discharging current to/from the lithium-ion battery 5 and the lead battery 9, respectively, and a state-of-charge detection means for detecting, based on an integrated value of each detected charging/discharging current, the state of charge of each of the lithium-ion battery 5 and the lead battery 9, and compute using a current integration method values normalized by the following equation: {charging/discharging current(A)×sampling time(s)/battery capacity(As).

An engine ECU 13 is also configured with a microcomputer including a CPU, a RAM, a ROM and an input/output unit. The engine ECU 13 and the battery ECU 1 are connected with each other through a CAN (controller area network), for example, and communicate information on such as the temperature and state of charge of the lithium-ion battery 5. The engine ECU 13 takes control of generation power by an alternator 2, based on a deceleration state of the engine (not shown in the figure) and the temperature and state of charge of the lithium-ion battery 5 so that the lithium-ion battery 5 is neither overcharged nor overdischarged.

The alternator 2 is a generator that is connected with the engine output shaft by a belt and capable of generating a voltage of 14 to 21 V, and whose rotor field current is controlled by a field duty signal from the engine ECU 13, so that its production current can be properly controlled.

Figure 2:
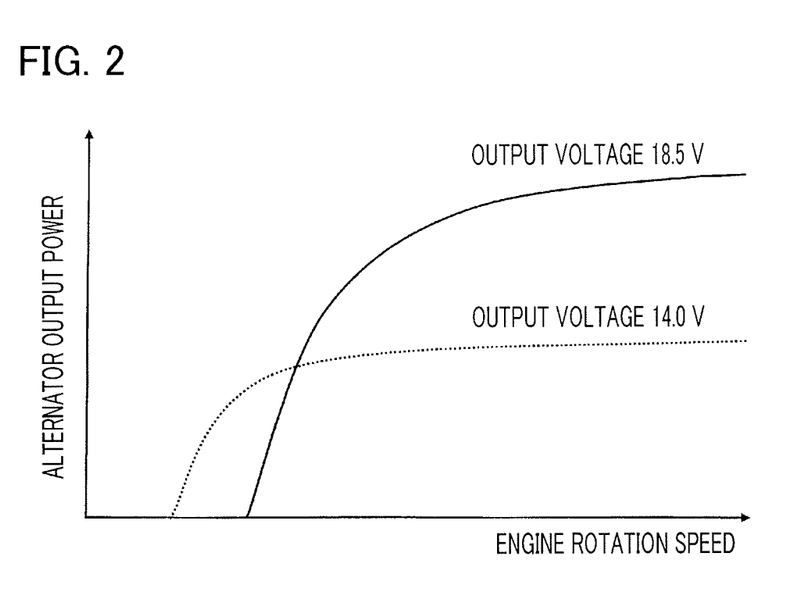
FIG. 2 is an explanatory diagram showing an example of relations between alternator rotation speed and output power with respect to different generation voltages.

The generator generates the voltage by making use of an induction voltage induced in the stator thereof with the rotor rotating; therefore the higher the generation voltage, the higher the rotation speed to start outputting the generated power. FIG. 2 shows an example of the output characteristics when the alternator 2 outputs voltages of 18.5 V and 14.0 V.

When the output voltage is increased from 14.0 V to 18.5 V, for example, as shown in FIG. 2, the output power characteristic curve shifts rightward, and the engine rotation speed at which the alternator can start outputting the generated power therefore becomes higher.

In a lithium-ion power supply system, since the alternator 2 and the lithium-ion battery 5 are directly connected with each other, the voltage of the alternator 2 in generating power becomes the same as that of the lithium-ion battery 5. Therefore in a state of the lithium-ion battery 5 being connected, when the alternator rotation speed is as low as that in idling, the alternator 2 cannot generate power any more.

A relay 4 for the lithium-ion battery is connected between the alternator 2 and the lithium-ion battery 5. The relay 4 is a relay using a coil or a semiconductor element, which is switched on (connected) by a drive signal from the battery ECU 1. An electrical load 10 includes headlamps and wipers, which are, from the point of view of cost and life restrictions, connected to a 12V system including the lead battery 9.

Next, the control operation will be explained in detail referring to flowcharts in FIG. 3 to FIG. 7. Here in FIG. 3 to FIG. 7, LIB denotes the lithium-ion battery 5; ALT, the alternator 2; and LIB relay, the relay 4 for the lithium-ion battery.

Control routines shown in FIG. 3 to FIG. 7 are part of control routines executed in the engine ECU 13; in the main routine of the engine ECU 13, computation for controlling not only the amount of fuel injection into the engine and ignition timing but also accessories such as the alternator 2 is carried out.

Figure 3:
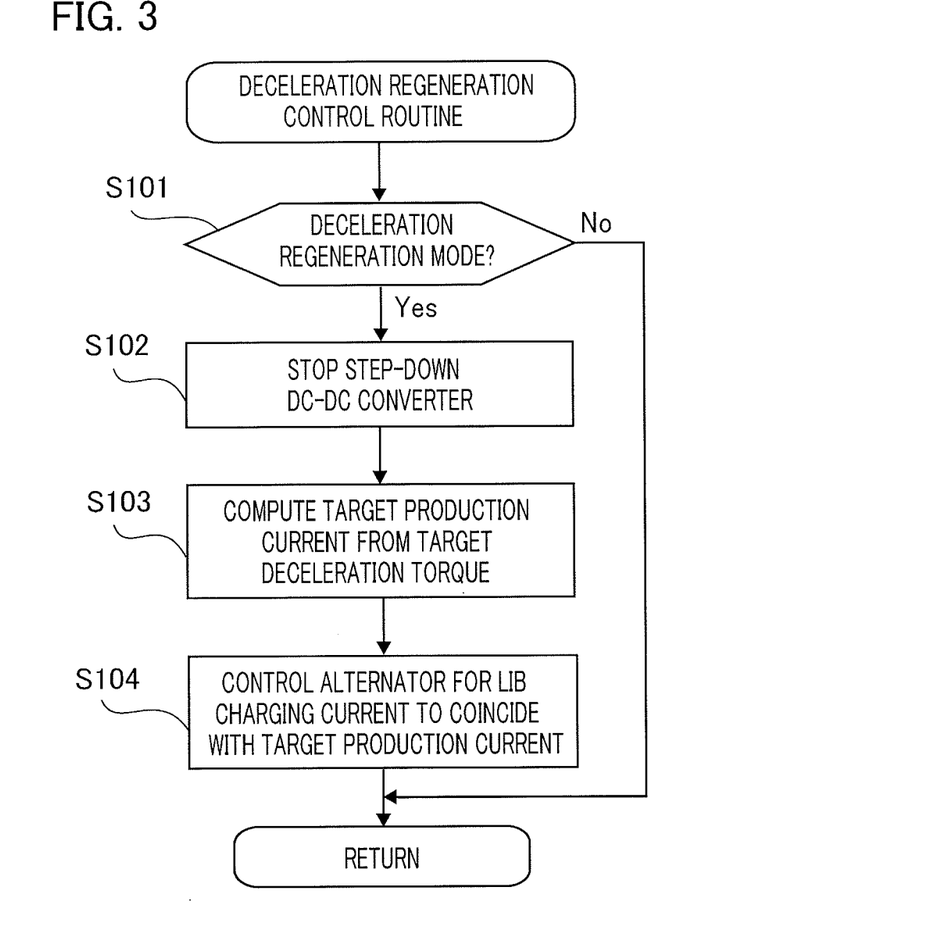
FIG. 3 is a flowchart showing a routine of deceleration regeneration control according to Embodiment 1 of the invention.

FIG. 3 shows a routine of deceleration regeneration control, which serves as a flowchart for taking control of operating the alternator 2 when the vehicle is in deceleration.

Firstly, a deceleration regeneration mode is defined such that the vehicle driver releases the acceleration pedal as the vehicle exceeding a predetermined speed and the vehicle comes into a fuel-cut control state.

If the vehicle is in the deceleration regeneration mode in Step S101, Step S102 ensues, the step-down DC-DC converter 3 is stopped, and all the current produced by the alternator 2 is made to flow into the lithium-ion battery 5. Next, a target current to be produced by the alternator 2 is computed from target deceleration torque of the vehicle in Step S103. The target deceleration torque is looked up and set referring to a table set in advance according to the vehicle speed.

Furthermore, the target deceleration torque is switched over in response to the on/off state of a brake switch for detecting depression of the brake pedal. When the brake pedal is depressed, a larger target deceleration torque value is set compared to that when the pedal is not depressed, so that greater deceleration energy can be regenerated.

In Step S104, the amount of current produced by the alternator 2 is feedback-controlled in such a way that a charging current to the lithium-ion battery 5 coincides with the target production current.

The output current from the alternator 2 varies with temperature even if the same field duty cycle is given; the output current is likely to increase in a low-temperature state. Therefore, when the output current is open-loop-controlled, an overcurrent would flow into the lithium-ion battery 5, thereby raising a fear of accelerating deterioration of the lithium-ion battery 5.

With this in mind, the step-down DC-DC converter 3 is turned off so as to create a state in which the produced current by the alternator 2 is equal to the charging current to the lithium-ion battery 5, and making use of a current sensor provided in the lithium-ion battery 5, the production current by the alternator 2 is controlled accurately.

Taking control as described above can prevent the overcurrent from flowing into the lithium-ion battery 5 and also prevent the lithium-ion battery from being overcharged even when the electrical load is abruptly changed and the temperature of the alternator 2 fluctuates, so that deterioration of the lithium-ion battery 5 can be suppressed.

When the acceleration pedal is depressed again or the vehicle speed is decreased below the predetermined value, the deceleration regeneration mode is completed.

Figure 4:
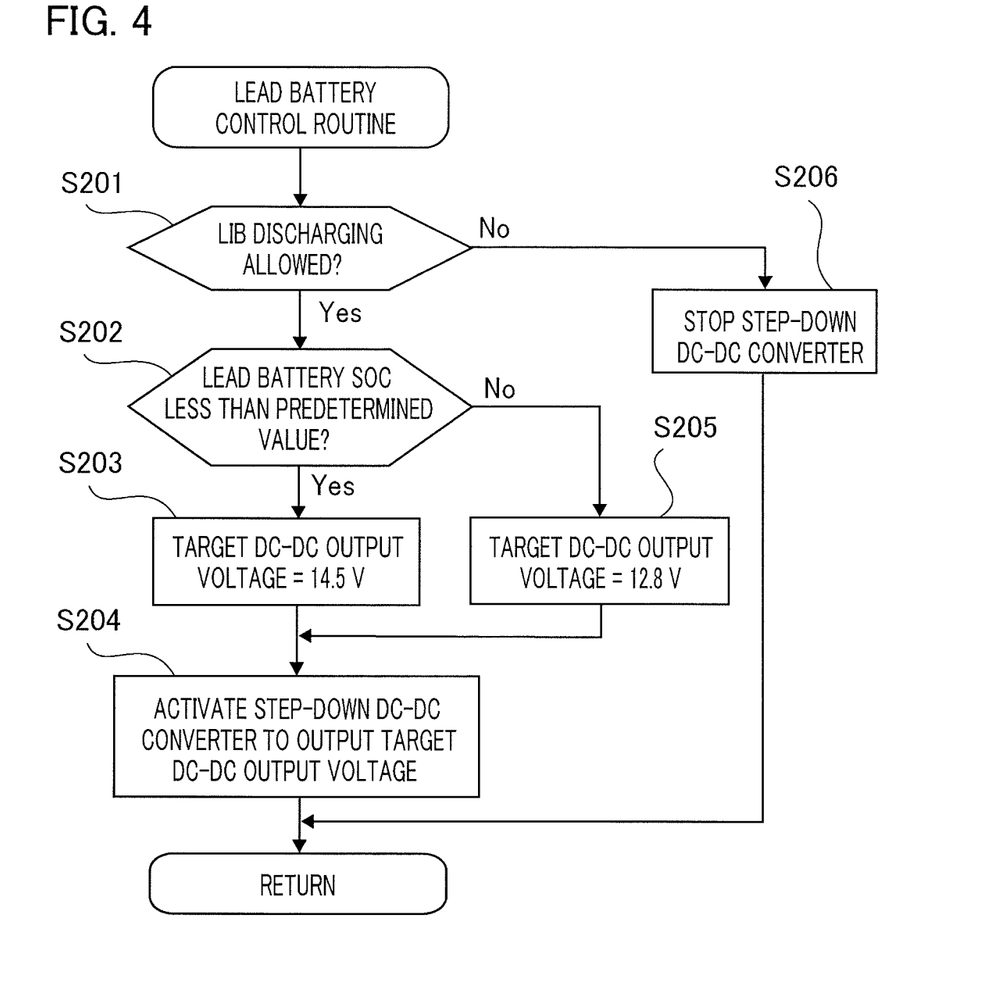
FIG. 4 is a flowchart showing a routine of lead battery charging control according to Embodiment 1 of the invention.

The lead battery charging control routine shown in FIG. 4 is executed except for the deceleration regeneration mode. In Step S201, if the voltage of the lithium-ion battery 5 is higher than a predetermined voltage and the SOC of the battery is greater than a predetermined value, the lithium-ion battery 5 is allowed to be discharged.

If the lithium-ion battery 5 is in a dischargeable state, whether or not to charge the lead battery 9 is determined based on the SOC of the battery 9 in Step S202. If the SOC of the lead battery 9 is less than a predetermined value, that is, if the lead battery is not fully charged, Step S203 ensues, the target output voltage of the step-down DC-DC converter 3 is set to a charging voltage of the lead battery, for example, 14.5 V, and then the step-down DC-DC converter 3 is activated to charge the lead battery 9.

When charging of the lead battery 9 progresses so that the SOC thereof becomes greater than the predetermined value, the target output voltage of the step-down DC-DC converter 3 is lowered and set to a voltage of, for example, 12.8 V at which the lead battery 9 is neither discharged nor charged, whereby power supplied to the electrical load 10 in vain is reduced and the power stored in the lithium-ion battery 5 is effectively made use of.

Controlling as described above can further enhance gas mileage in addition to that enhanced by the foregoing regeneration.

Meanwhile, if the lithium-ion battery 5 is not fully charged and the discharging is not allowed in Step S201, Step S206 ensues and then the step-down DC-DC converter 3 is stopped.

The above is the control routine, under the normal conditions, to make use of the lithium-ion battery 5 for the deceleration regeneration.

Figure 5:
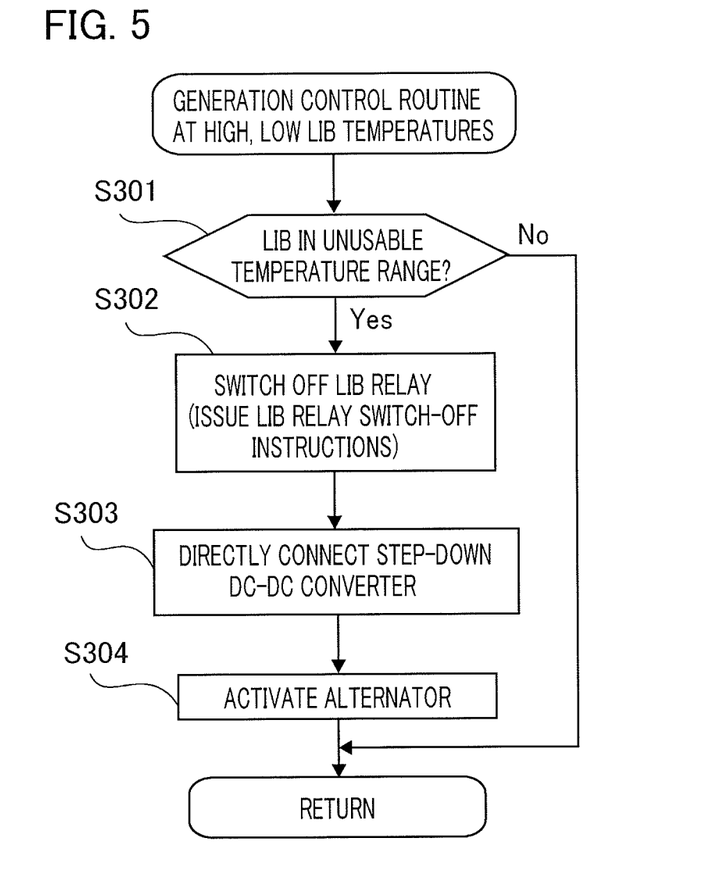
FIG. 5 is a flowchart showing a routine of generation control at low and high temperatures of a lithium-ion battery according to Embodiment 1 of the invention.

Next, a generation control routine when the temperature of the lithium-ion battery 5 is outside a range of the battery operating safely without deterioration will be explained referring to FIG. 5.

If the lithium-ion battery 5 is charged at a low temperature, for example, lower than 0° C. or the battery is charged and discharged at a high temperature, for example, higher than 60° C., its deterioration is significantly accelerated. If this happens, using the lithium-ion battery 5 needs to be stopped, and power generated by the alternator 2 needs to be directly supplied to the lead battery 9 or the electrical load 10 by way of the step-down DC-DC converter 3.

Therefore, firstly in Step S301, if the temperature of the lithium-ion battery 5 is lower than a predetermined value or higher than another predetermined value, Step S302 ensues in order to stop using the lithium-ion battery 5. In Step S302, the relay 4 for the lithium-ion battery is switched off, so as to disconnect the lithium-ion battery 5 from the power supply system. The details of control sequence of switching on and off the relay 4 for the lithium-ion battery will be described later referring to FIG. 7.

Next in Step S303, a duty cycle of driving the step-down DC-DC converter 3 is increased to 100%, that is, the converter is brought into a directly-connected state.

In general, the alternator 2 is configured in such a way that when starting generation, power is supplied from a battery connected thereto so as to produce a field current necessary for the generation, and after the generation is enabled, the field current is produced using the power generated by itself.

For that reason, when the lithium-ion battery 5 is disconnected, the alternator 2 needs to be temporarily supplied with power from the lead battery 9 when starting the generation; therefore, the alternator 2 cannot start the generation unless the step-down DC-DC converter 3 is directly connected thereto at the beginning.

Afterwards in Step S304, the alternator 2 is controlled, in the state of the step-down DC-DC converter being directly connected, in such a way that the voltage to the lead battery 9 and the electrical load 10 becomes 14.5 V. By controlling such as the above, the lead battery 9 and the electrical load 10 can be stably supplied with power even when the lithium-ion battery 5 is disconnected from the power supply system.

Figure 7:
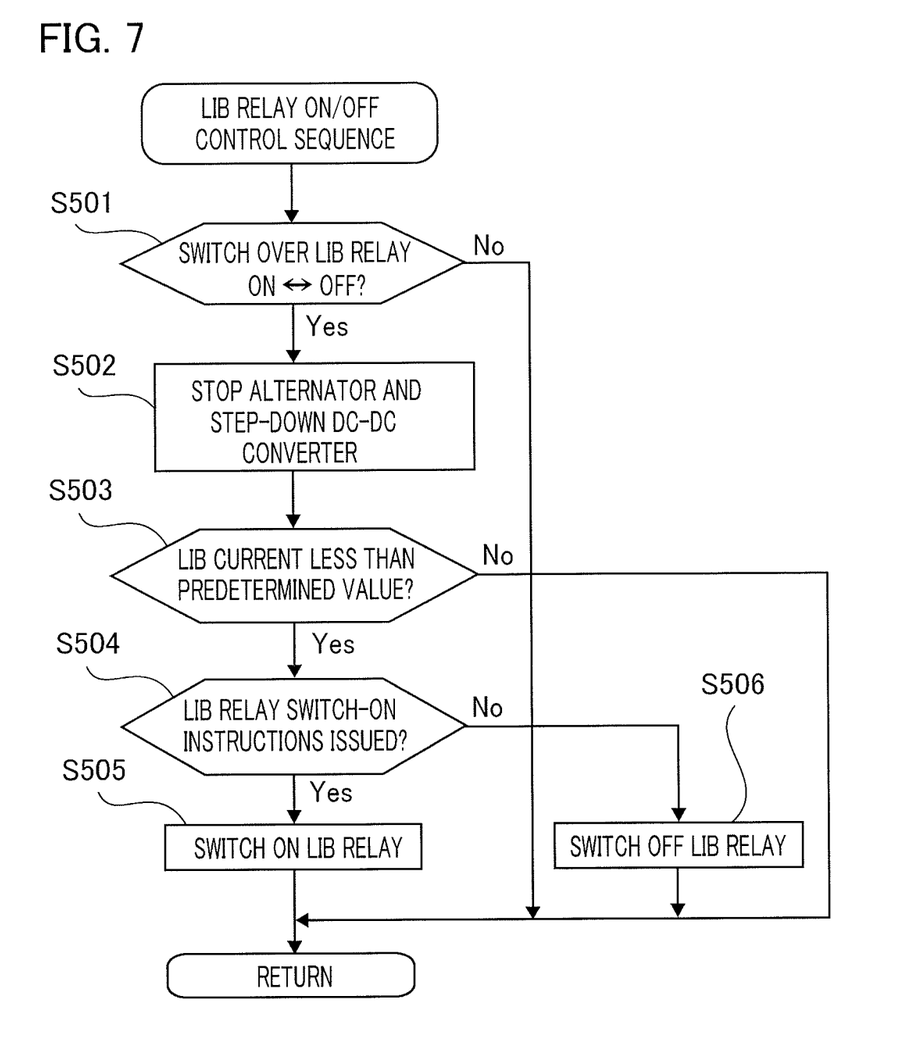
FIG. 7 is a flowchart showing a sequence of taking on/off control of a relay for a lithium-ion battery according to Embodiment 1 of the invention.

Now, the control sequence of switching over the relay 4 for the lithium-ion battery from on to off or vice versa will be explained referring to FIG. 7.

Firstly, when the relay 4 for the lithium-ion battery is switched over between the on and off states in Step S501, Step S502 ensues and then the alternator 2 and the step-down DC-DC converter 3 are stopped. Next, a current flowing into the lithium-ion battery 5 is checked in Step S503. If the current flowing into the lithium-ion battery becomes lower than a predetermined value, Step S504 ensues and then the relay 4 for the lithium-ion battery is switched over between the on and off states.

By taking sequence control as described above, the relay 4 can be switched over between the on and off states after the current flowing into the relay 4 is detected having decreased to nearly zero, whereby deterioration of the relay 4 can be prevented. In addition, since specifications required for the relay 4 can be eased, the relay can be reduced in cost as well as size.

Moreover, in the configuration of the power supply system shown in FIG. 1, the generation voltage by the alternator 2 coincides with the voltage of the lithium-ion battery 5; therefore the generation voltage comes close to 18.5 V when the battery is made up of five cells, for example. The higher the generation voltage, the higher the rotation speed at which the alternator 2 starts outputting power; therefore the alternator 2 cannot generate a voltage as high as 18.5 V at a low engine rotation speed such as that in idling, and as a result, the lithium-ion battery 5 cannot be charged.

If idling continues, the lithium-ion battery 5 is not fully charged, thereby raising a fear that the lead battery 9 cannot be fully charged either.

Figure 6:
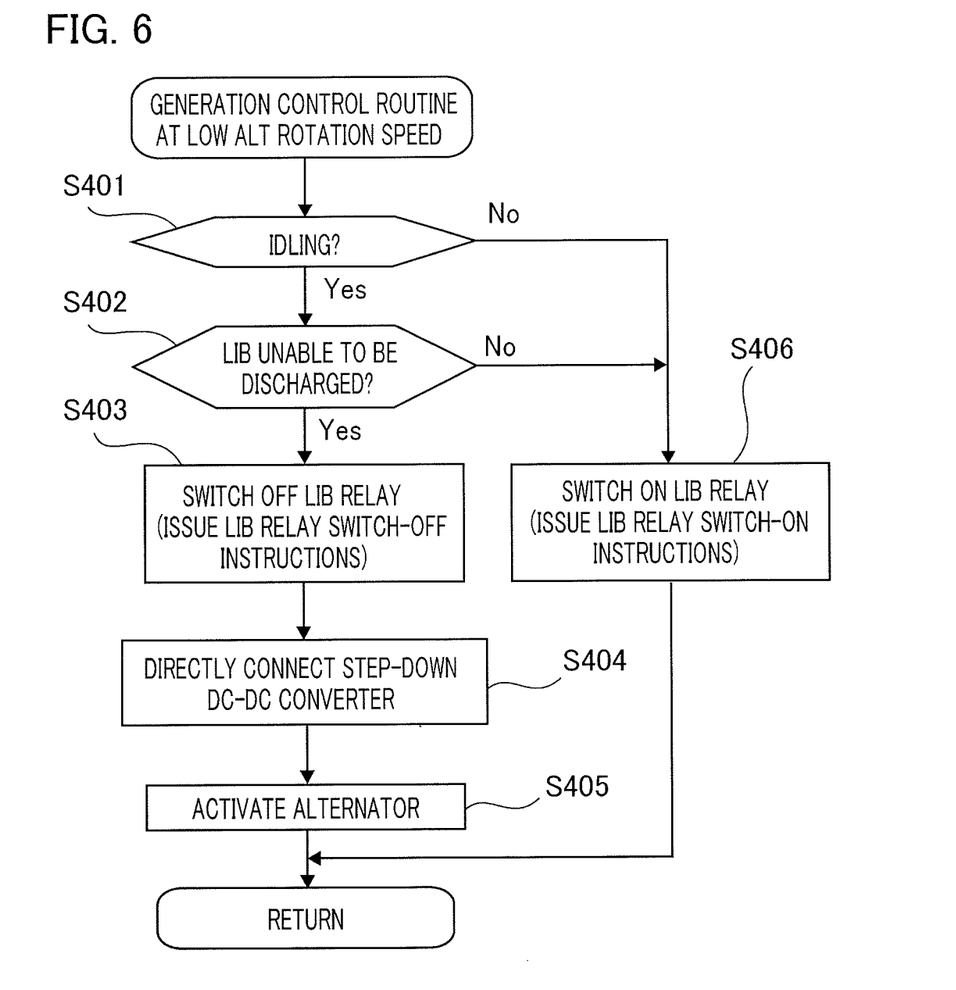
FIG. 6 is a flowchart showing a routine of generation control at low alternator rotation speed according to Embodiment 1 of the invention.

Therefore, Step S402 ensues when idling, as shown in FIG. 6, and then determination is made as to whether or not the lithium-ion battery 5 can be discharged, that is, whether or not the battery is fully charged. If the battery is in an undischargeable state, Step S403 ensues and the relay 4 for the lithium-ion battery is switched off following the sequence in FIG. 7. And then, the step-down DC-DC converter 3 is brought into the directly-connected state, the alternator 2 is activated, and the power generated by the alternator 2 is supplied to the lead battery 9 and the electrical load 10 by way of the converter 3.

By taking control as described above, the lead battery 9 can be prevented from becoming not fully charged even when idling continues, so that the lead battery 9 and the electrical load 10 can be stably supplied with power.

Meanwhile in Step S402, if the SOC of the lithium-ion battery 5 is great enough even in idling and the battery is in the dischargeable state, the relay 4 for the lithium-ion battery remains switched on and the lithium-ion battery 5 charges the lead battery 9 by way of the step-down DC-DC converter 3.

Various modifications and alterations of this invention will be apparent to those skilled in the art without departing from the scope and spirit of this invention, and it should be understood that this is not limited to the illustrative embodiments set forth herein.

What is claimed is:

1. A vehicular power supply system, comprising:
   a lead battery;
   a lithium-ion battery that is charged and discharged at a voltage higher than the lead battery's voltage;
   a step-down DC-DC converter that is connected between the lead battery and the lithium-ion battery and whose output voltage is controllable;
   a generator connected with the step-down DC-DC converter and the lithium-ion battery;
   a lithium-ion battery SOC detection means for detecting a state of charge of the lithium-ion battery;
   a relay for the lithium-ion battery by which the lithium-ion battery is connected to and disconnected from the generator and the step-down DC-DC converter; and
   a control means, based on the state of charge of the lithium-ion battery, for taking control of switching on and off the relay for the lithium-ion battery; and
   a lithium-ion battery temperature detection means for detecting a temperature of the lithium-ion battery,
   wherein the control means switches off the relay for the lithium-ion battery when the temperature of the lithium-ion battery is lower than or higher than a predetermined temperature range, and operates the generator with the step-down DC-DC converter continuously activated.

2. The vehicular power supply system according to claim 1, wherein the control means switches off the relay for the lithium-ion battery when the state of charge of the lithium-ion battery is less than a predetermined value and an engine rotation speed is low, and operates the generator with the step-down DC-DC converter continuously activated.

3. The vehicular power supply system according to claim 1, wherein when the relay for the lithium-ion battery is switched on or off, the switching on or off of the relay is carried out after the generator and the step-down DC-DC converter are stopped, so that a charging and discharging current of the battery decreases to lower than a predetermined value.

4. The vehicular power supply system according to claim 1, wherein when the generator regenerates power during deceleration, the control means stops the step-down DC-DC converter and takes control of the generator in such a way that the charging current of the lithium-ion battery coincides with a target production current.

5. The vehicular power supply system according to claim 1, further comprising a lead battery SOC detection means for detecting a state of charge of the lead battery, wherein when the state of charge of the lead battery is greater than a predetermined value, the control means sets the output voltage of the step-down DC-DC converter to a voltage at which the lead battery is not discharged, whereas when the state of charge thereof is less than the predetermined value, the control means sets the output voltage of the step-down DC-DC converter to a voltage at which the lead battery charges.

* * * * *